US012481150B2

(12) United States Patent
Schatz et al.

(10) Patent No.: US 12,481,150 B2
(45) Date of Patent: Nov. 25, 2025

(54) MICROMECHANICAL DEVICE

(71) Applicant: Robert Bosch GmbH, Stuttgart (DE)

(72) Inventors: Frank Schatz, Kornwestheim (DE);
Jochen Tomaschko, Gaeufelden (DE);
Kerrin Doessel, Stuttgart (DE); Timo Schary, Aichtal-Neuenhaus (DE)

(73) Assignee: ROBERT BOSCH GMBH, Stuttgart (DE)

( * ) Notice: Subject to any disclaimer, the term of this patent is extended or adjusted under 35 U.S.C. 154(b) by 312 days.

(21) Appl. No.: 17/916,513

(22) PCT Filed: May 28, 2021

(86) PCT No.: PCT/EP2021/064315
§ 371 (c)(1),
(2) Date: Sep. 30, 2022

(87) PCT Pub. No.: WO2022/002499
PCT Pub. Date: Jan. 6, 2022

(65) Prior Publication Data
US 2023/0152572 A1 May 18, 2023

(30) Foreign Application Priority Data
Jul. 2, 2020 (DE) ..................... 10 2020 208 290.1

(51) Int. Cl.
*G02B 26/08* (2006.01)
*B81B 3/00* (2006.01)

(52) U.S. Cl.
CPC ........ *G02B 26/0833* (2013.01); *B81B 3/0072* (2013.01); *B81B 2201/042* (2013.01);
(Continued)

(58) Field of Classification Search
CPC .............. G02B 26/0833; B81B 3/0072; B81B 2201/042; B81B 2203/0109; B81B 2203/0154
See application file for complete search history.

(56) References Cited

U.S. PATENT DOCUMENTS 6,429,034 B1    8/2002  Pai et al.
2001/0053016 A1  12/2001  Nelson
(Continued)

FOREIGN PATENT DOCUMENTS

CN      105103031 A     11/2015
DE   102013224631 A1     6/2015
(Continued)

OTHER PUBLICATIONS

International Search Report for PCT/EP2021/064315, Issued Aug. 31, 2021.

*Primary Examiner* — James C. Jones
(74) *Attorney, Agent, or Firm* — NORTON ROSE FULBRIGHT US LLP

(57) ABSTRACT

A micromechanical device, in particular a micromirror device. The device has at least one first micromechanical component and one second micromechanical component. The first component and the second component are directly or indirectly joined to one another. The first micromechanical component has a first sub-body and at least one second sub-body. The first sub-body extends in a first plane and the second sub-body in a second plane different from the first plane. The first plane and the second plane extend parallel to one another and the first plane extends above the second plane. The second sub-body is arranged in a transitional region to the second micromechanical component. A second extent of the second sub-body in the longitudinal direction is greater than a first extent of the first sub-body in the longitudinal direction.

16 Claims, 6 Drawing Sheets

(52) U.S. Cl.
    CPC ............... *B81B 2203/0109* (2013.01); *B81B 2203/0154* (2013.01)

(56) References Cited

U.S. PATENT DOCUMENTS

2002/0017563 A1    2/2002  Tokuda et al.
2018/0307038 A1*  10/2018  Carminati .......... G02B 26/0816

FOREIGN PATENT DOCUMENTS

| | | |
|---|---|---|
| JP | 2010060592 A | 3/2010 |
| JP | 2010128116 A | 6/2010 |
| WO | 2009089946 A2 | 7/2009 |
| WO | 2010113602 A1 | 10/2010 |
| WO | 2020010225 A1 | 1/2020 |

* cited by examiner

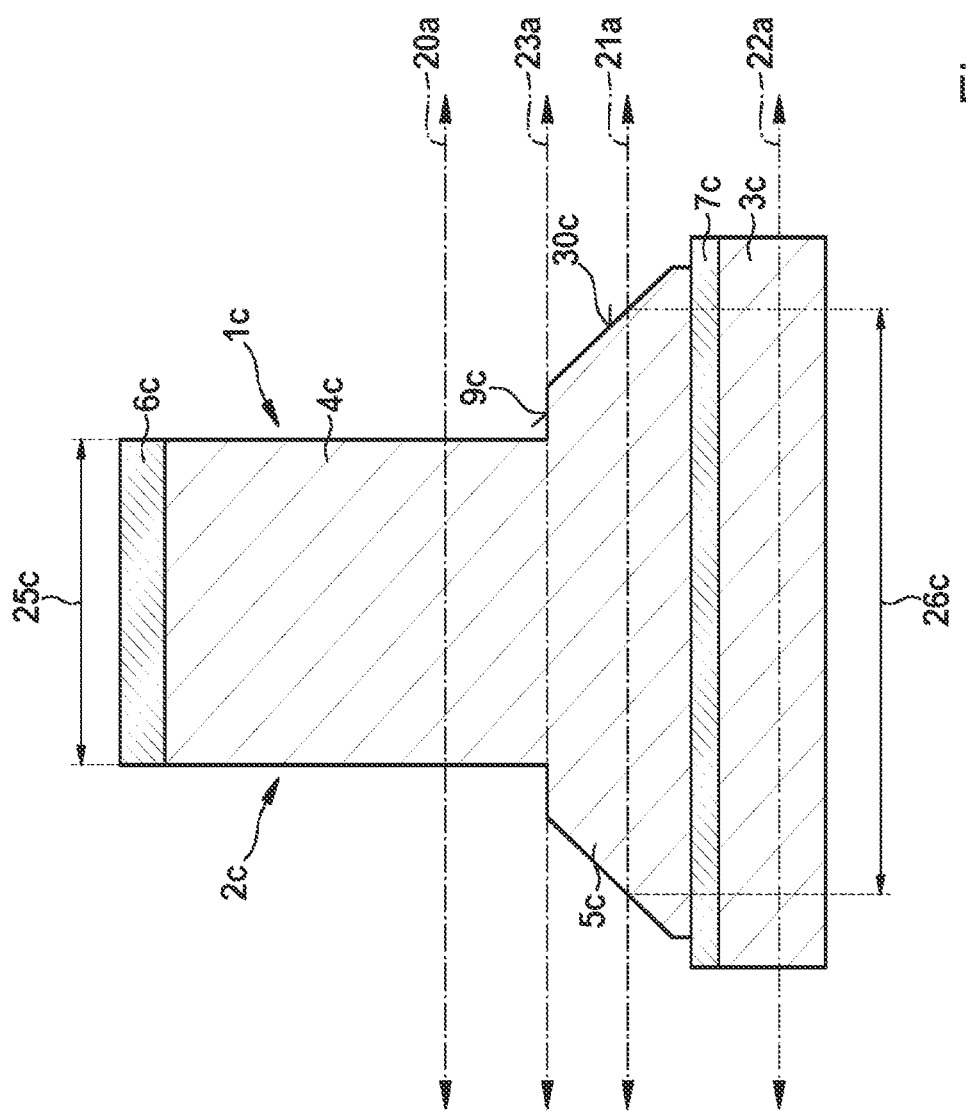

MICROMECHANICAL DEVICE

FIELD

The present invention relates to a micromechanical device, in particular a micromirror device, and to a method for producing the micromechanical device.

BACKGROUND INFORMATION

A micromirror device is described in U.S. Patent Application Publication No. US 2018/0307038 A1 in the form of a micromechanical device in which mirror plate and spring element are arranged in different, mutually parallel planes and are joined together by a further element in an intermediate plane. This is intended to reduce the dynamic deformation of the mirror element.

One problem which arises in this connection is that, on displacement of the mirror, a peak strain arises locally at the right-angled transition from mirror plate to connection element which may lead to breakage of the component at this edge.

Starting from this related art, it is an object of the present invention to develop a micromechanical device which is more robust under dynamic load.

SUMMARY

To achieve the object, a micromechanical device, and a method for producing the micromechanical device are provided according to example embodiments of the present invention.

The micromechanical device in particular represents a micromirror device. Alternatively, the micromechanical device is configured in particular as a micromechanical pressure sensor or micromechanical inertial sensor or micromechanical pump. According to an example embodiment of the present invention, the micromechanical device has at least one first micromechanical component and one second micromechanical component. The first component and the second component are directly or indirectly joined to one another. The first and/or second micromechanical component preferably takes the form of a semiconductor material, in particular silicon. The first micromechanical component has a first sub-body and at least one second sub-body. The first micromechanical component is in this respect in particular of one-piece construction. The first sub-body extends in a first plane and the second sub-body in a second plane different from the first plane. The first and second planes extend parallel to one another, the first plane extending above the second plane. In particular, the first and second planes are horizontally extending planes. In particular, the first and second sub-bodies are separated from one another along a parting plane, in particular a horizontal parting plane. The second sub-body is arranged in a transitional region to the second micromechanical component. The transitional region here represents in particular an indirect or direct connection region of the first micromechanical component to the second micromechanical component. A second extent of the second sub-body in the longitudinal direction, in particular in the second plane, is here greater than a first extent of the first sub-body in the longitudinal direction, in particular in the first plane. The extents in the longitudinal direction of the respective sub-bodies are here in particular taken to mean the distances from outer edge to outer edge of the first and second sub-bodies in horizontal direction. The first and second sub-regions preferably overlap at least in part and the resultant, outwardly protruding step between first and second sub-bodies leads to the dynamic loading arising being subdivided between two edges. The micromechanical device can thus withstand higher dynamic loading. The first sub-body is preferably arranged centrally above the second sub-body.

According to an example embodiment of the present invention, the second micromechanical component is preferably arranged in a plane of the micromechanical device different from the first and second planes. The third plane here extends parallel to the first and second planes. Thus, the second micromechanical component fulfills a supporting function for the first micromechanical component.

According to an example embodiment of the present invention, the first and second micromechanical components are preferably made in one piece from silicon, in particular crystalline silicon. In this connection, the second sub-body of the first micromechanical component at least in part directly adjoins the second micromechanical component. In the transitional region between the first and second micromechanical components, the two micromechanical components are accordingly not materially separate from one another. Such a micromechanical device has the fabrication-related advantage that just one single, in particular plate-shaped, silicon substrate is required for fabrication.

Alternatively, the first and second micromechanical components are preferably made from silicon. The micromechanical device in this respect additionally has at least one silicon oxide layer.

The first and second micromechanical components are joined, in particular bonded, by way of the silicon oxide layer. The second sub-body of the first micromechanical component preferably at least in part directly adjoins the silicon oxide layer. In the transitional region between the first and second micromechanical components, the two micromechanical components are accordingly materially separate from one another.

According to an example embodiment of the present invention, the micromechanical device is preferably configured as a micromirror device. In this connection, the first micromechanical component is configured as a micromirror and the second micromechanical component as an, in particular resilient, spring element. One challenge when designing micromirrors is how to achieve large displacement angles. The greater the displacement angle, the higher the stress loading on the spring. Such stress loading may however lead to breaks in the transitional edges between spring element and micromirror. The additional step between first and second sub-bodies now enables the dynamic loading arising to be subdivided between two edges. The consequence is that the micromirror device can be operated with greater displacement angles.

According to an example embodiment of the present invention, a shape and/or the second extent of the second sub-body in the longitudinal direction and/or a height of the second sub-body is/are preferably selected as a function of a predetermined mechanical strain distribution of the micromechanical device. Preferably, the height of the second sub-body in relation to the first sub-body is selected such that the stress is uniformly distributed and/or such that, in the case of the silicon oxide layer, as much strain as possible is removed from the silicon oxide layer. To this end, the height of the second sub-body is preferably selected to be distinctly less than the height of the first sub-body. The ratio of the height of the second sub-body to the height of the first sub-body preferably amounts to at least 1:10. A length of the outwardly protruding step between first and second sub-bodies, in particular a lengthwise extent of the second sub-face of the second sub-body, is preferably greater than the height of the second sub-body. In other words, the resultant step is preferably longer than it is high. The second sub-body preferably has a height of at least 10 µm and at most 20 µm. The outwardly protruding step between the first and second sub-bodies, in particular the lengthwise extent of the second sub-face of the second sub-body, has a length of at least 30 µm and at most 50 µm.

According to an example embodiment of the present invention, the first and second sub-bodies of the first micromechanical component preferably have a rectangular cross-section. The step between the first and second sub-bodies thus has an edge, in particular of 90°, and the outer side of the second sub-body extends in a sixth plane, which extends substantially perpendicular to the first and/or second planes. Alternatively, the second sub-body of the first micromechanical device has a first sub-face, which extends at least in part in a fourth plane. This fourth plane extends obliquely to the first and/or second and/or third planes. The step between the first and second sub-bodies may thus have an obliquely extending outer side, extending in particular concavely or convexly or with a uniform gradient.

The second sub-body of the first micromechanical device preferably has a second sub-face, which extends in a fifth plane, in particular a parting plane of the first from the second sub-body, the fifth plane extending parallel to the first and/or second and/or third planes. The step between the first and second sub-bodies thus has a planar sub-face.

The present invention also provides a method for producing a micromechanical device as described above, in particular a micromirror device.

BRIEF DESCRIPTION OF THE DRAWINGS

FIG. 3A shows a third example embodiment of a micromechanical device, according to the present invention.

DETAILED DESCRIPTION OF EXAMPLE EMBODIMENTS

Figure 1A:
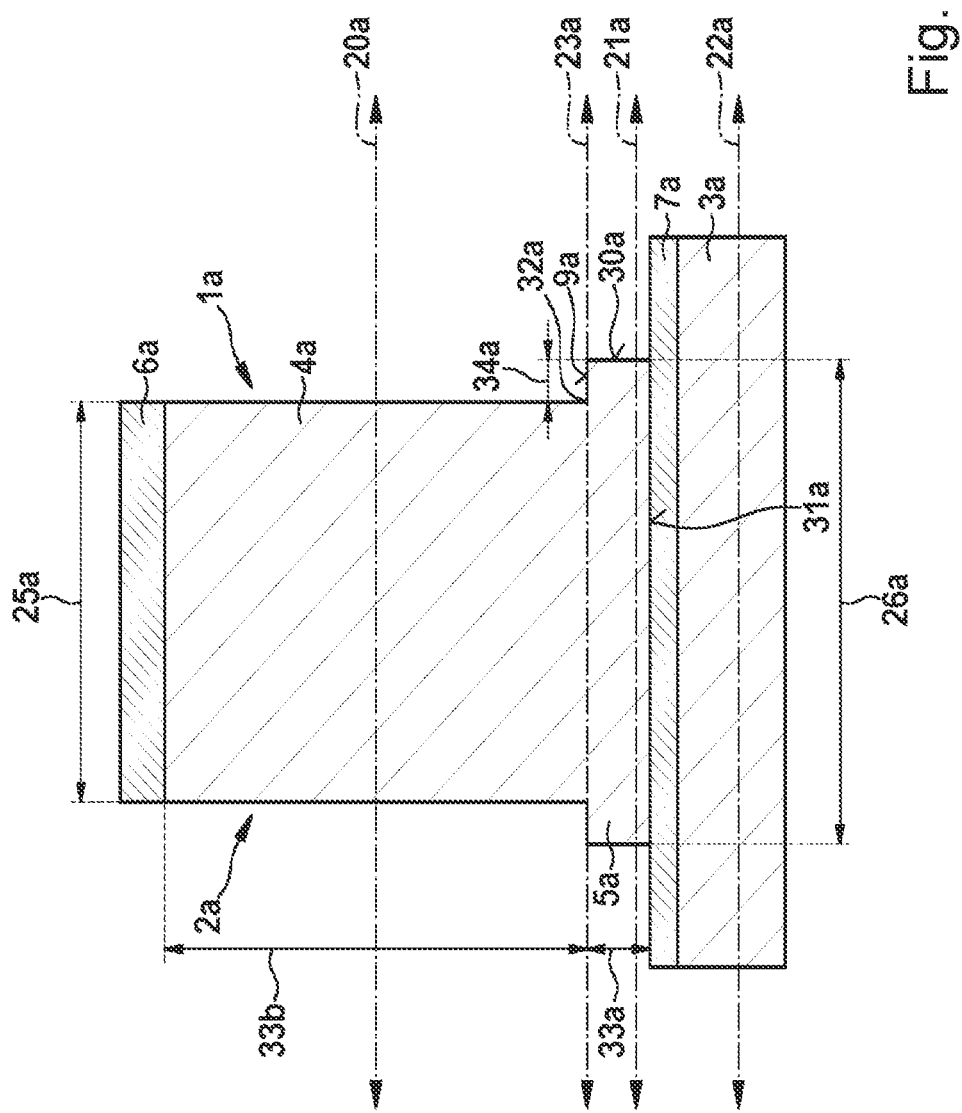
FIG. 1A shows a first example embodiment of a micromechanical device, according to the present invention.

FIG. 1A is a schematic representation of a first embodiment of a micromechanical device 1a. The micromechanical device 1a is here preferably configured as a micromirror device. The micromechanical device 1a has a first micromechanical component 2a and a second micromechanical component 3a. The first component 2a and the second component 3a are here indirectly joined to one another via a silicon oxide layer 7a. The first micromechanical component 2a has a first sub-body 4a and at least one second sub-body 5a. The first sub-body 4a extends in a first plane 20a and the second sub-body 5a in a second plane 21a different from the first plane 20a. The first plane 20a and the second plane 21a extend parallel to one another, the first plane 20a extending above the second plane 21a. The second sub-body 5a is arranged in a transitional region to the second micromechanical component 3a. In this first exemplary embodiment, in the transitional region, the bottom 31a of the second sub-body 5a of the first micromechanical component 1a directly adjoins the silicon oxide layer 7a. A second extent 26a of the second sub-body 5a in the longitudinal direction, in particular in the second plane 21a, is here greater than a first extent 25a of the first sub-body 4a in the longitudinal direction, in particular in the first plane 20a. A step thus arises between the first sub-body 4a and the second sub-body 5a, which step has, in this first embodiment, a second sub-face 9a of the second sub-body 5a, which extends in a fifth plane 23a. This fifth plane 23a is here configured as a parting plane of the first 4a from the second 5a sub-body and extends parallel to the first 20a and/or second 21a planes. The lengthwise extent 34a of the second sub-face 9a of the second sub-body 5a is here greater than a height 33a of the second sub-body 5a. In other words, the resultant step is preferably longer than it is high.

The second micromechanical component 3a is arranged in a third plane 22a of the micromechanical device 1a different from the first 20a and second 21a planes. The third plane 22a extends parallel to the first 20a and second 21a planes.

The micromirror device shown, as micromechanical device 1a, has as first micromechanical component 2a a micromirror and as second micromechanical component 3a an, in particular resilient, spring element.

In the first embodiment, the first sub-body 4a and second sub-body 5a of the first micromechanical component 1a have a rectangular cross-section, such that the step between first sub-body 4a and second sub-body 5a has an edge 32a, in particular of 90°, and an outer side 30a of the second sub-body 5a extends in a sixth plane (not shown here), which extends substantially perpendicular to the first 20a and/or second 21a planes.

The height of the second sub-body 33b in relation to the height 33a of the first sub-body 4a is here selected such that as much strain as possible is removed from the silicon oxide layer 7a. To this end, the height 33a of the second sub-body 5a is selected to be distinctly less than the height 33b of the first sub-body 4a. The ratio of the height 33a of the second sub-body 5a to the height 33b of the first sub-body 4a amounts here to substantially 1:10.

In this exemplary embodiment, the micromechanical device additionally has a second silicon oxide layer 6a, which is arranged on the first sub-body 4a of the first micromechanical component 2a.

Figure 1B:
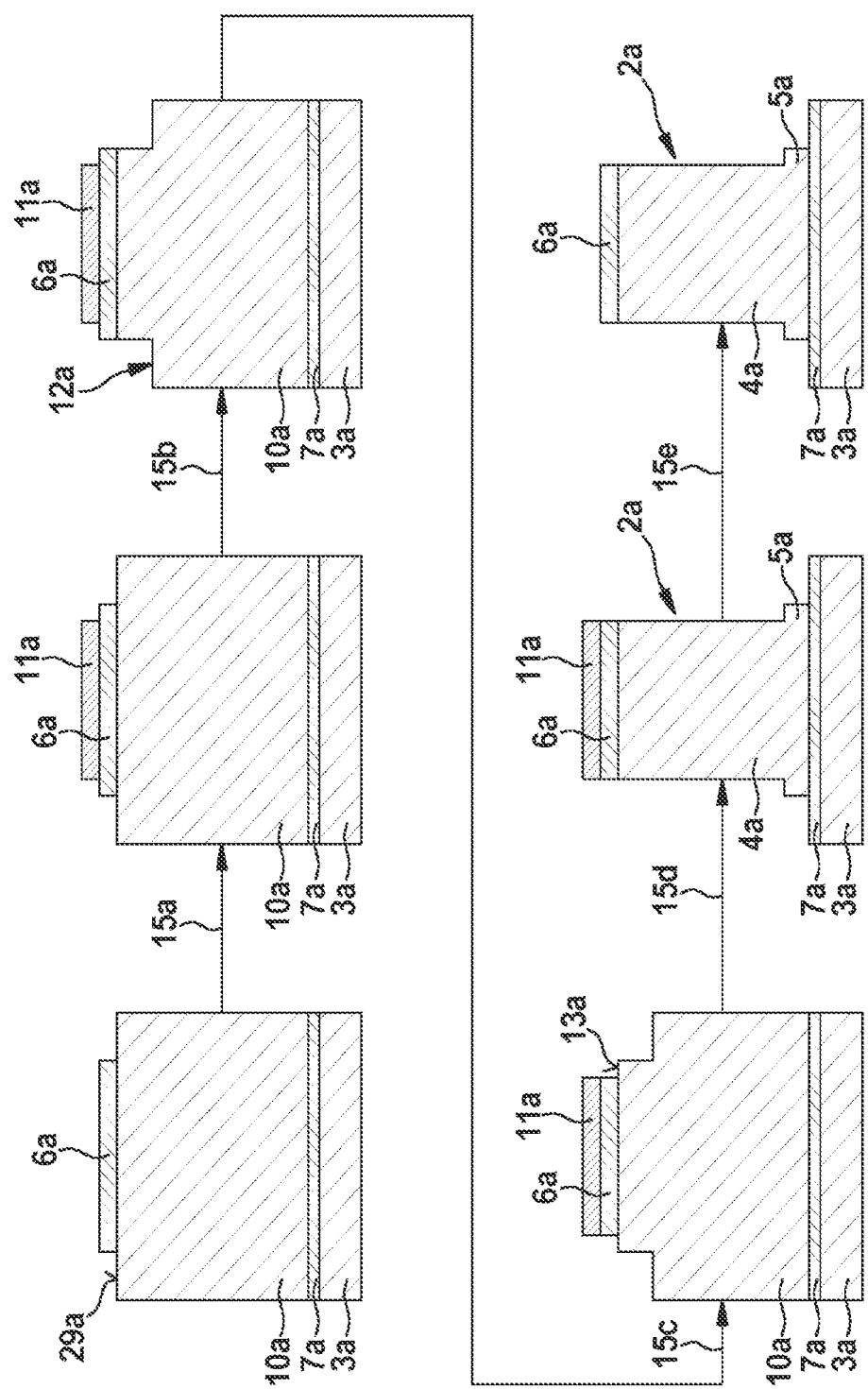
FIG. 1B shows a method for producing the first example embodiment of the micromechanical device, according to the present invention.

FIG. 1B shows a method for producing the micromechanical device 1a. In this method, in a first method step a silicon substrate 10a, in particular a plate-shaped silicon substrate, is arranged above the second micromechanical component 3a and the silicon oxide layer 7a. The structure of silicon substrate 10a, silicon oxide layer 7a and micromechanical component 3a is in particular a silicon oxide wafer. Moreover, a first etching mask 6a, in particular a further silicon oxide layer, is arranged on the top 29a of the silicon substrate. In a subsequent method step 15a, a second etching mask 11a is applied to the first etching mask 6a. The second etching mask is in particular a photoresist layer. In a method step 15b, material of the silicon substrate 10a is then removed in a trenching process such that recesses 12a with a defined shape are produced in the top of the silicon substrate 10a. In a subsequent method step 15c, part of the first etching mask 6a is removed in an etch step in such a way that a sub-face 13a of the silicon substrate 10a is exposed to the outside. In a subsequent method step 15d, material of the silicon substrate 10a is further etched away in a downward direction in a further, second trenching process in such a way that a first micromechanical component 2a is produced which has a first sub-body 4a and a second sub-body 5a according to FIG. 1A. In a final method step 15e, the second etching mask 11a is removed.

Figure 2A:
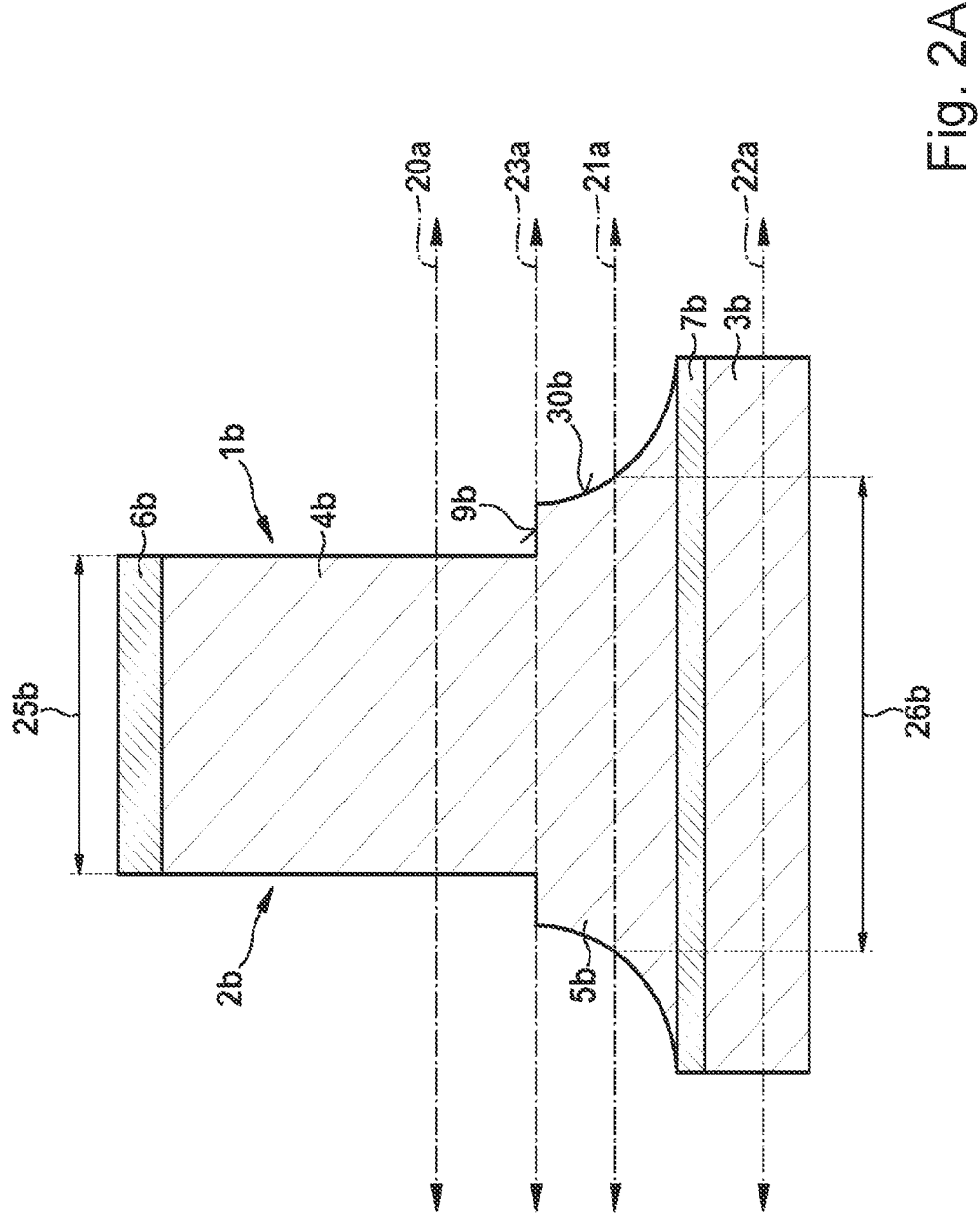
FIG. 2A shows a second example embodiment of a micromechanical device, according to the present invention.

FIG. 2A shows a second embodiment of a micromechanical device 1b. Unlike in the first embodiment, the micromechanical device 1b here has a second sub-body 5b, the outer side 30b of which is of curved, in particular concave, configuration. This outer side 30b thus extends, as a first sub-face of the second sub-body 5b, at least in part in a fourth plane (not shown here), which extends obliquely to the first 20a and second 21a planes.

Here too, the micromechanical device 1b is configured as a micromirror device with a first micromechanical component 2b and a second micromechanical component 3b. The first component 2b and the second component 3b are here indirectly joined to one another via a silicon oxide layer 7b. Here too, the first micromechanical component 2b has a first sub-body 4b and at least one second sub-body 5b. The first sub-body 4b extends in the first plane 20a and the second sub-body 5b extends in the second plane 21. Here too, the second sub-body 5b is arranged in a transitional region to the second micromechanical component 3b. A second extent 26a of the second sub-body 5a in the longitudinal direction in the second plane 21a is greater here too than a first extent 25a of the first sub-body 4a in the longitudinal direction in the first plane 20a.

Figure 2B:
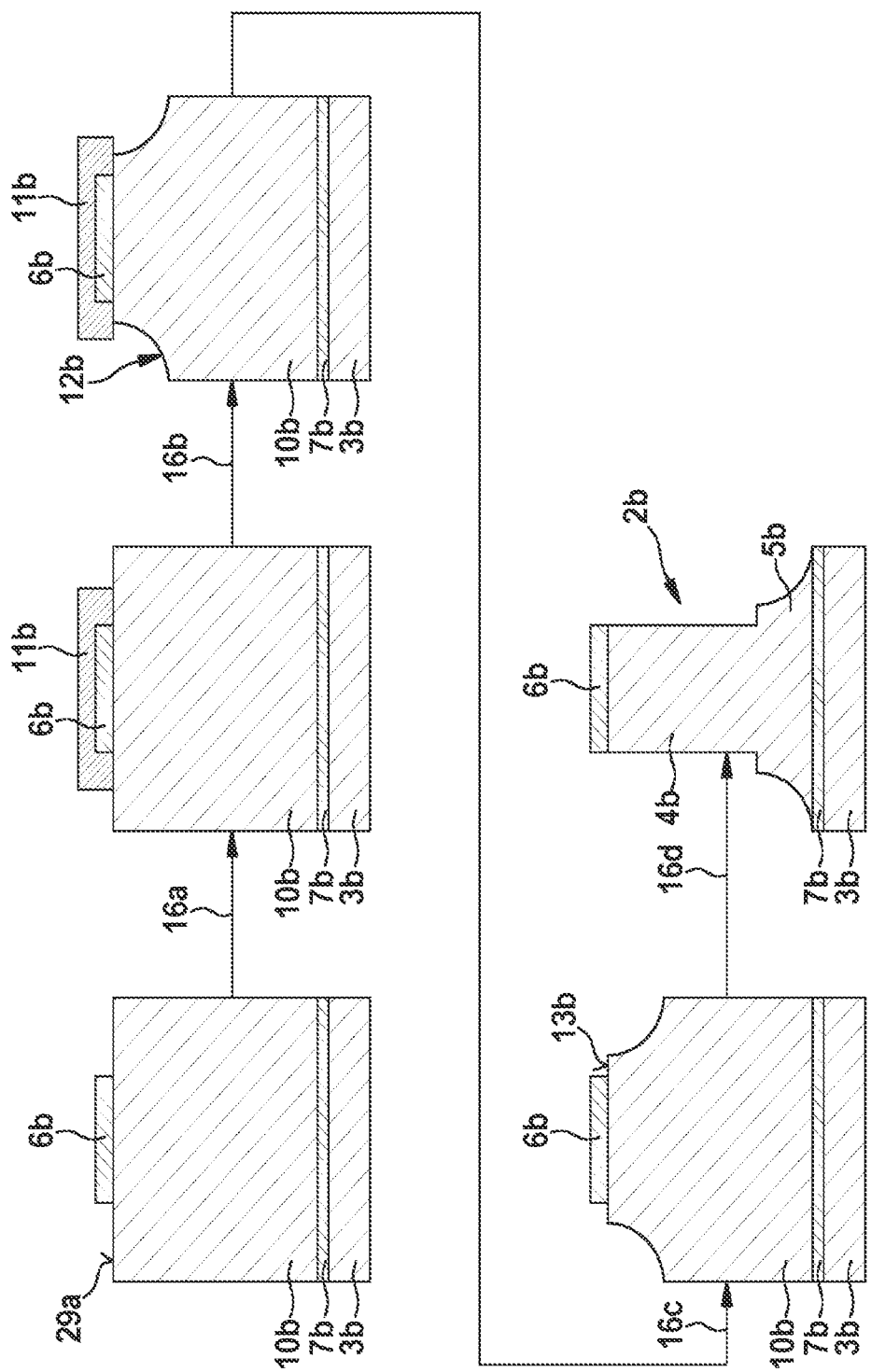
FIG. 2B shows a method for producing the second example embodiment of the micromechanical device, according to the present invention.

FIG. 2B shows a method for producing the micromechanical device 1b. Here too, first of all a silicon oxide wafer is provided, which has a silicon substrate 10b, in particular a plate-shaped silicon substrate, a second micromechanical component 3b and the silicon oxide layer 7b. Moreover, a first etching mask 6b is arranged on the top 29b of the silicon substrate. In a subsequent method step 16a, a second etching mask 11b is applied to the first etching mask 6b and the top 29b of the silicon substrate 10b. The second etching mask 11b is in particular a photoresist layer. In a method step 16b, an isotropic silicon etch step follows, in which material of the silicon substrate 10a is removed in such a way that recesses 12b with a defined shape are produced in the top 29b of the silicon substrate 10b. In a subsequent method step 16c, the second etching mask 11b is removed in an etch step. In a subsequent method step 16d, material of the silicon substrate 10b is further etched away in a downward direction in a trenching process in such a way that a first micromechanical component 2a is produced which has a first sub-body 4b and a second sub-body 5b according to FIG. 2A.

FIG. 3A shows a third embodiment of a micromechanical device 1c. In contrast to the first embodiment and second embodiment, the micromechanical device 1c here has a second sub-body 5c, whose oblique outer side 30c has a uniform gradient. This outer side 30b thus extends, as a first sub-face of the second sub-body 5b, completely in the fourth plane (not shown here), which extends obliquely to the first 20a and second 21a planes.

Here too, the micromechanical device 1c is configured as a micromirror device with a first micromechanical component 2c and a second micromechanical component 3c. The first component 2c and the second component 3c are here indirectly joined to one another via a silicon oxide layer 7c. Here too, the first micromechanical component 2c has a first sub-body 4c and at least one second sub-body 5c. The first sub-body 4c extends in the first plane 20a and the second sub-body 5c extends in the second plane 21. Here too, the second sub-body 5c is arranged in a transitional region to the second micromechanical component 3c. A second extent 26c of the second sub-body 5c in the longitudinal direction in the second plane 21a is greater here too than a first extent 25c of the first sub-body 4c in the longitudinal direction in the first plane 20a.

Figure 3B:
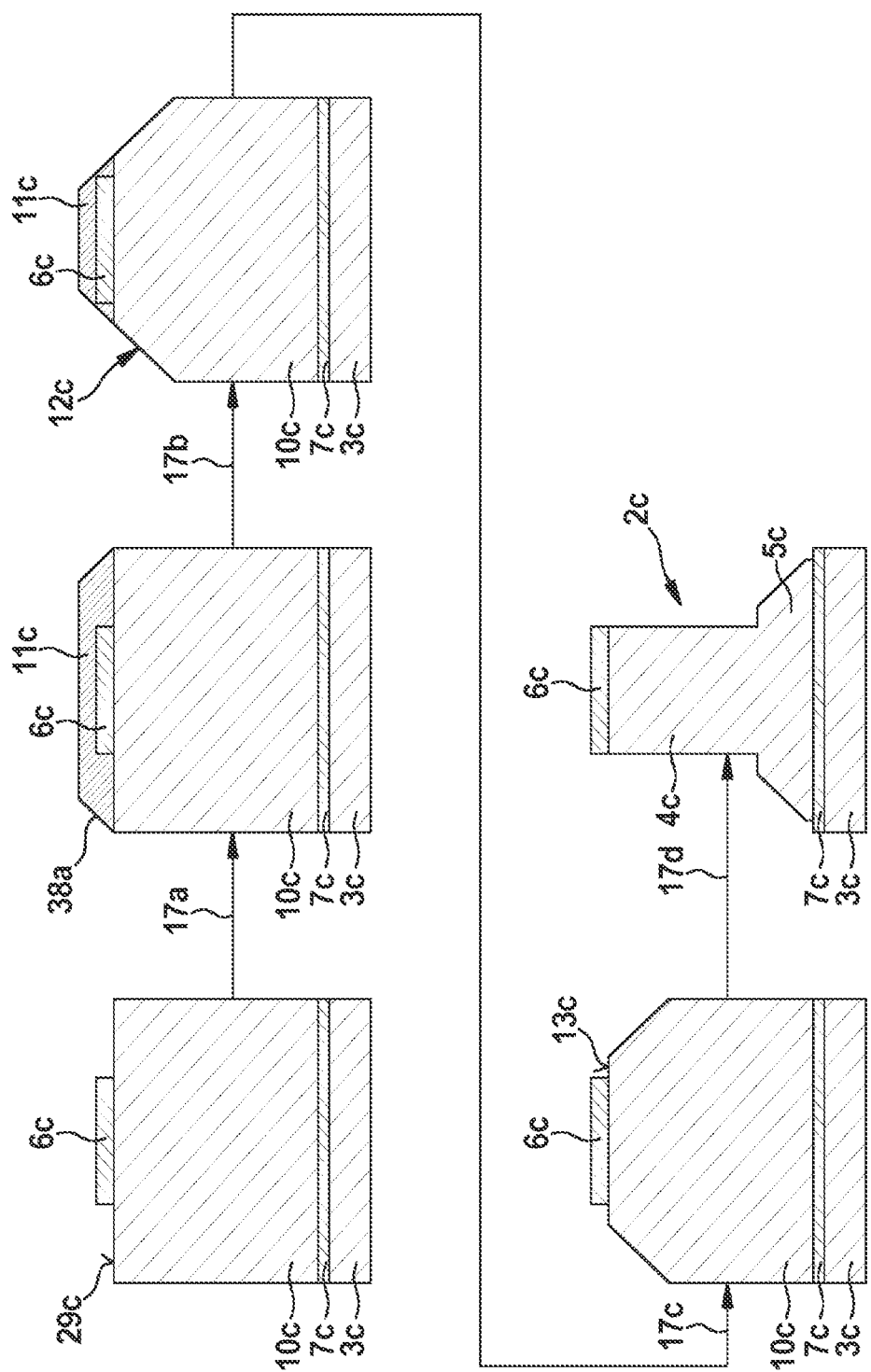
FIG. 3B shows a method for producing the third example embodiment of the micromechanical device, according to the present invention.

FIG. 3B shows a method for producing the micromechanical device 1c. Here too, first of all a silicon oxide wafer is provided, which has a silicon substrate 10c, in particular a plate-shaped silicon substrate, a second micromechanical component 3c and the silicon oxide layer 7c. Moreover, a further silicon oxide layer is arranged as first etching mask 6c on the top 29c of the silicon substrate 10c. In a subsequent method step 17a, a second etching mask 11c is applied to the first etching mask 6c and the top 29c of the silicon substrate 10c.

The second etching mask 11c is in particular a photoresist layer. The photoresist is applied or fully baked in such a way that it has a defined resist sidewall 38a in the marginal region of the second etching mask 11c. In the subsequent etch step in method step 17b, this resist sidewall is then imparted to the silicon body. In a subsequent method step 17c, the remaining part of the second etching mask 11c is removed in a further etch step. In a subsequent method step 17d, material of the silicon substrate 10c is further etched away in a downward direction in a further, second trenching process in such a way that a first micromechanical component 2c is produced which has a first sub-body 4c and a second sub-body 5c according to FIG. 3A.

What is claimed is:

1. A micromechanical device, comprising:
    a first micromechanical component; and
    a second micromechanical component, the first component and the second component being directly or indirectly joined to one another, the first micromechanical component having a first sub-body and at least one second sub-body, the first sub-body extending in a first plane and the second sub-body extending in a second plane different from the first plane, the first plane and the second plane extending parallel to one another, the first plane extending above the second plane, the second sub-body being arranged in a transitional region to the second micromechanical component, a second extent of the second sub-body in a longitudinal direction in the second plane, being greater than a first extent of the first sub-body in the longitudinal direction in the first plane.

2. The micromechanical device as recited in claim 1, wherein the micromechanical device is a micromirror device.

3. The micromechanical device as recited in claim 1, wherein the second micromechanical component is arranged in a third plane of the micromechanical device different from the first plane and the second plane, the third plane extending parallel to the first plane and the second plane.

4. The micromechanical device as recited in claim 1, wherein the first and second micromechanical components are made in one piece from crystalline silicon.

5. The micromechanical device as recited in claim 4, wherein a bottom of the second sub-body of the first micromechanical component at least in part directly adjoins the second micromechanical component.

6. The micromechanical device as recited in claim 1, wherein the first and the second micromechanical components are made of silicon, the micromechanical device additionally having at least one silicon oxide layer, and the first and second micromechanical components are joined by way of the silicon oxide layer.

7. The micromechanical device as recited in claim 6, wherein the second sub-body of the first micromechanical component at least in part directly adjoins the silicon oxide layer.

8. The micromechanical device as recited in claim 1, wherein the micromechanical device is a micromirror device, the first micromechanical component being configured as a micromirror and the second micromechanical component being a resilient spring element.

9. The micromechanical device as recited in claim 1, wherein a shape and/or the second extent of the second sub-body in the longitudinal direction and/or a height of the second sub-body is selected as a function of a predetermined mechanical strain distribution of the micromechanical device.

10. The micromechanical device as recited in claim 1, wherein the first sub-body and the second sub-body of the first micromechanical component each has a rectangular cross-section.

11. The micromechanical device as recited in claim 3, wherein the second sub-body of the first micromechanical device has a first sub-face which extends at least in part in a fourth plane, the fourth plane extending obliquely to the first and/or second and/or third planes.

12. The micromechanical device as recited in claim 11, wherein the second sub-body of the first micromechanical device has a second sub-face, which extends in a fifth plane, the fifth plane being a parting plane of the first from the second sub-body, the fifth plane extending parallel to the first and/or second and/or third planes.

13. The micromechanical device as recited in claim 12, wherein a lengthwise extent of the second sub-face of the second sub-body is greater than a height of the second sub-body.

14. The micromechanical device as recited in claim 1, wherein a total height of the first sub-body is greater than a total height of the second sub-body.

15. The micromechanical device as recited in claim 14, wherein a ratio of the height of the second sub-body to the height of the first sub-body amounts to at least 1:10.

16. A method for producing a micromechanical device, comprising:
producing a first micromechanical component; and
producing a second micromechanical component, the first component and the second component being directly or indirectly joined to one another, the first micromechanical component having a first sub-body and at least one second sub-body, the first sub-body extending in a first plane and the second sub-body extending in a second plane different from the first plane, the first plane and the second plane extending parallel to one another, the first plane extending above the second plane, the second sub-body being arranged in a transitional region to the second micromechanical component, a second extent of the second sub-body in a longitudinal direction in the second plane, being greater than a first extent of the first sub-body in the longitudinal direction in the first plane.

* * * * *